INVENTORS
RICHARD H. BAILES
RAY S. LONG
BY
ATTORNEY

TYPICAL EQUILIBRIUM ISOTHERMS FOR THE DISTRIBUTION OF URANIUM
BETWEEN PHOSPHORIC ACID (30% $P_2O_5$) AND EXTRACTANTS $K^*_{max}$ vs. OXIDATION POTENTIAL FOR THE DISTRIBUTION OF URANIUM
BETWEEN PHOSPHORIC ACID AND EXTRACTANTS AT 25°C

INVENTORS
RICHARD H. BAILES
RAY S. LONG
BY

ATTORNEY

United States Patent Office 2,859,092
Patented Nov. 4, 1958

2,859,092

SOLVENT EXTRACTION PROCESS FOR THE RECOVERY OF METALS FROM PHOSPHORIC ACID

Richard H. Bailes, Walnut Creek, and Ray S. Long, Concord, Calif., assignors, by mesne assignments, to the United States of America as represented by the United States Atomic Energy Commission Application February 5, 1953, Serial No. 335,276

27 Claims. (Cl. 23—14.5)

This invention relates to a solvent extraction process for recovering metal values including uranium, thorium and other lanthanide and actinide elements from phosphoric acid solution and, especially, to a process which is adapted for the economical recovery and purification of such metal values from crude industrial phosphoric acid solutions.

Many phosphatic rocks contain small amounts of uranium as well as a complex mixture of other materials. Very large amounts of these phosphatic rocks are processed by various methods to produce crude industrial phosphoric acid or acidic phosphatic solutions which contain these minor amounts of uranium and many impurities. As millions of tons of these phosphatic materials are processed annually, it is apparent that a substantial amount of uranium would be made available therefrom by provision of an economical and efficient method of recovery.

The recovery of uranium from such a material is difficult in view of the relatively low content in the ore and acid. Also, the uranium is very soluble in phosphoric acid due apparently to complexing phenomena. Moreover, the recovery of the uranium is complicated by the presence of the many impurities which may be present greatly in excess of the uranium.

Now it has been discovered that the uranium may be recovered from such an acidic phosphatic solution by extraction with an immiscible solvent phase containing alkyl phosphoric, alkyl phosphonic or alkyl phosphitic acids. The uranium is then recovered by alternative methods from the extract. Through the provision and control of specific operating conditions the recovery of uranium is efficient even from very dilute solutions and purification from various impurities is obtained. Moreover, with appropriate modification the process is applicable to many materials other than uranium, as will become apparent hereinafter.

Accordingly, it is an object of the invention to provide an economical solvent extraction process for recovering uranium from phosphatic rock.

Another object of the invention is to employ alkyl phosphoric, alkyl phosphonic and alkyl phosphitic acids to extract metals including uranium from acidic phosphatic solutions.

Still another object of the invention is to employ alkyl phosphoric, alkyl phosphonic and alkyl phosphitic acids in admixture with a solvent diluent for extracting various metals including uranium from acidic phosphatic solutions.

A further object of the invention is to provide a process wherein alkyl phosphoric, alkyl phosphonic and alkyl phosphitic acids in admixture with a diluent solvent is employed to extract uranium from crude industrial phosphoric acid solutions and wherein the uranium is recovered from the solvent phase.

A still further object of the invention is to provide methods for recovering uranium from alkyl phosphoric, alkyl phosphonic and alkyl phosphitic acid extractant phases.

The invention possesses other objects and advantages which will become apparent from the following description and accompanying drawing. With reference to said drawing.

The process of the invention will be described with particular reference to the results obtained by various single-stage extractive techniques. Therefore, it will be understood that the data given hereinafter will relate, generally, to single-stage extractions unless context indicates otherwise. However, it will be apparent to one skilled in the art that the teachings of the invention are also applicable to multiple stage countercurrent, continuous batch, batch countercurrent and continuous countercurrent operations.

In general, the single-stage extractions were performed by contacting an aqueous phosphoric acid phase and the solvent extractant for one minute or more while applying vigorous agitation to assure approach to equilibrium conditions. The phases were then separated and analyses performed to ascertain the content of the extracts.

For convenience in evaluating and describing the results obtained, certain conventionalized and simplified distribution coefficient terms are employed. Such terms are derived as follows:

For conservation of mass the following will be true:

$$C_H = C_O V_O / V_A + C_A$$

wherein, $C_H$ is the concentration of the material in the head acid.

$C_O$ is the concentration of the material in the organic extractant phase.

$C_A$ is the uranium concentration in the aqueous phase.

$V_O$ is the volume of the organic phase.

$V_A$ is the volume of the aqueous phase.

Figure 1:
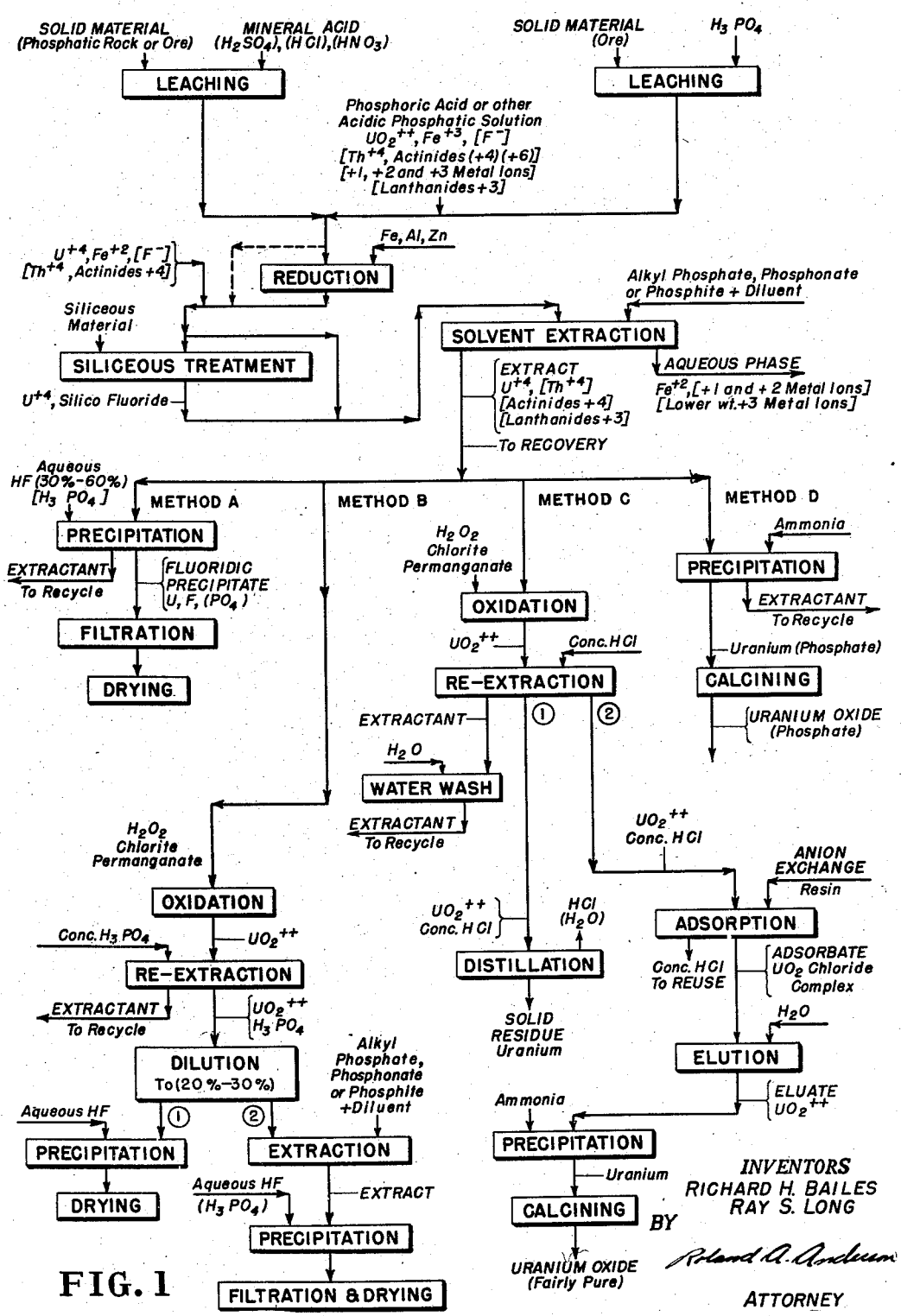
Figure 1 is a flowsheet illustrating the process of the invention.
Figure 2:
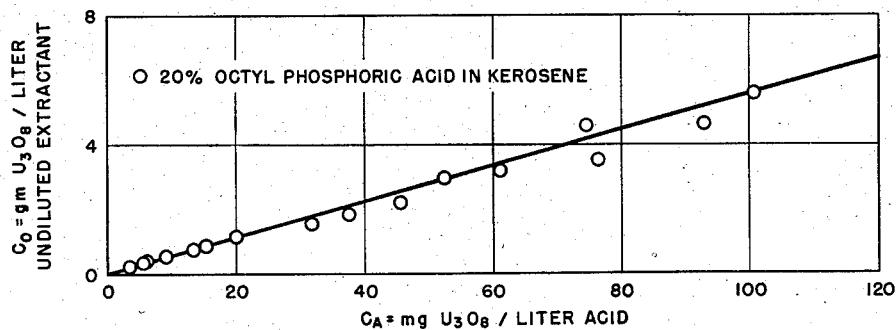
Figure 2 is a graphical illustration of a typical isotherm relating distributed concentration of uranium in organic and aqueous phases.

The distribution coefficient can be determined only approximately from the results of a single extraction as analyses may not be performed with the required degree of precision. Such coefficient is more accurately ascertained by determining the isotherm from a number of experiments at different phase ratios and measuring the slope of the isotherm curve. The isotherm is obtained by plotting either $C_O$ vs. $C_A$ or $C_A$/volume fraction of extractant in the organic phase, vs. $C_A$. In the first case the slope is $K_D$, in the second case the slope is $K^*$. A typical linear isotherm obtained in extracting uranium from a 30% $P_2O_5$ (phosphoric acid) solution with 20% octyl phosphoric acid in kerosene solution, is illustrated in Fig. 2.

The magnitude of the extraction can be indicated either as the percentage of uranium extracted or by a distribution coefficient as follows:

Percentage extracted is calculated from the expression $$100\left(1 - \frac{C_A}{C_H}\right)$$

and is therefore a function of the ratio of the organic and aqueous phases. Valid comparisons of extractions performed under different conditions are obtainable by comparing the curves obtained by plotting percentage extracted against this volume ratio. Values for percentage extraction are meaningless without consideration of the volume ratio.

The distribution coefficient, $K_D$, is the ratio of the concentration of the material in the organic to that in the aqueous phases, i. e., $K_D = C_O/C_A$. In the case where the isotherm (plot of $C_O$ vs. $C_A$) is linear, $K_D$ is independent of volume ratio and $K$, alone, is a valid criterion of the magnitude of extraction. With alkyl ortho-phosphates the isotherms were found to be linear in substantially all of the large number of cases studied.

$K_D$ is a function of the concentration of the extractant in the organic phase as may be demonstrated by plotting $K_D$ against the volume fraction of extractant in the organic phase. With the extractant materials disclosed herein, the slope of the curve of the plotted values is linear, i. e., $K_D$/volume fraction of extractant in the organic phase, is a value dependent on neither the phase ratios nor the concentration of extractant. This value is given the designation $K^*$ and represents the coefficient for the distribution of pure material into undiluted extractant.

Values for the function $K^*$ provide the easiest and most convenient comparisons of extractions wherein phase ratios and extractant concentrations are not constant. The values for the function $K_D$ are of more interest in engineering and plant design.

In general, the invention contemplates the treatment of acidic phosphatic or other phosphoric acid solutions whereby a variety of metal values may be concentrated, purified and recovered. Large quantities of such solutions are produced during the conversion of phosphate rocks into fertilizer; however, such a solution may be produced in many other ways and to accomplish many other purposes. For example, mineral acid leaching of phosphatic rock and leaching of solid materials, such as ores, with phosphoric acid will each yield acidic phosphatic solutions containing metal values recoverable by the present process. In any event, there is first produced an acidic phosphatic solution of the metal value to be recovered. For illustrative purposes the description will refer extensively to the recovery of uranium from various acidic phosphatic solutions; however, it will be understood that the extraction processes of the invention may be applied to the preferential extraction of metal values which have an appreciable solubility in the acidic phosphatic solution. Such recoverable metal values are further characterized as those soluble materials which may exist as multiple charged positive ions in the solution, whereby they are extractable by the extractants of the invention.

The phosphate concentration of the solution may vary over wide ranges of concentration with the solvent extraction being somewhat more effective with lower phosphate concentrations. Log log plots of $K^*$ vs. phosphate concentration indicate that $K^*$ varies approximately as the inverse fourth power of the phosphate concentration. However, one of the chief advantages of the present process is that efficient uranium recovery of the order of 90-95% may be effected with simple batch operation from phosphoric acid solutions of relatively high phosphate concentration and low uranium content such as those produced in fertilizer manufacture. Typical analyses of such acid solutions are indicated in the following table:

TYPICAL ACID COMPOSITION

| | |
|---|---|
| Phosphate _____g./liter__ | 500–600 |
| Uranium ($U_3O_8$ equivalent) _____mg./liter__ | 100–150 |
| Sulfate _____g./liter__ | 25–55 |
| Ferrous iron _____g./liter__ | 0.04–0.35 |
| Ferric iron _____g./liter__ | 5–8 |
| Fluoride _____g./liter__ | 16–25 |
| Siliceous material _____g./liter__ | 2–7 |
| Sp. gr. _____ | 1.2–1.36 |
| E. M. F. (volts vs. S. C. E.) _____ | —0.2– —0.45 |

Practicable recovery of uranium is possible with even lower uranium content, especially if the phosphate concentration is lower. With higher uranium content the recovery is simplified and is virtually total.

When the acid is processed under ordinary conditions the uranium will be present in the hexavalent or uranyl state. However, as it has been found that ions which possess the largest number of positive charges are preferentially extracted by the extractants of the invention, the solution is preferably reduced whereby the uranium is present in the quadrivalent ($U^{+4}$) state and impurities are reduced to an ionic state possessing the least number of positive charges. Iron, for example, is reduced to the much less easily extracted ferrous ($Fe^{+2}$) state.

Two beneficial results are therefore obtained by the reduction. The reduction places the uranium in the +4 ionic state which is much more easily extracted than the hexavalent (uranyl) ionic state. Iron and other reduced impurities are extracted to a lesser degree and the extracted uranium is obtained in a more purified condition. Where uranium content is low and phosphate concentration is high, i. e., above about 20-25% concentration, the reduction step is most beneficial to the recovery of the uranium. An analogous situation exists for all elements which may exist in various positive ionization states in the acidic phosphatic solution.

A convenient method for determining the oxidation state of the acid is to measure the oxidation potential developed between a Pt and a standard calomel electrode (S. C. E.) immersed in the solution. The relation between the oxidation potential and the ratio of ferrous to ferric iron has been determined to vary in accordance with the following equation:

$$E = -0.200 + 0.06 \log 10(Fe^{+2})/(Fe^{+3})$$

The potential for synthetic phosphoric acid was found to be similar; however, $E_0$ in this case was —0.210 volt.

Iron, aluminum and zinc are satisfactory reducing agents for treating the solution. Electrolytic reduction is also feasible and may be advantageously employed for large-scale operations. Iron is employed as a particulate form disposed in a column through which the solution is passed, in the absence of oxygen. Consumption of iron is reduced and the efficiency of the reduction increased if the iron is first washed with dilute HCl.

Figure 3:
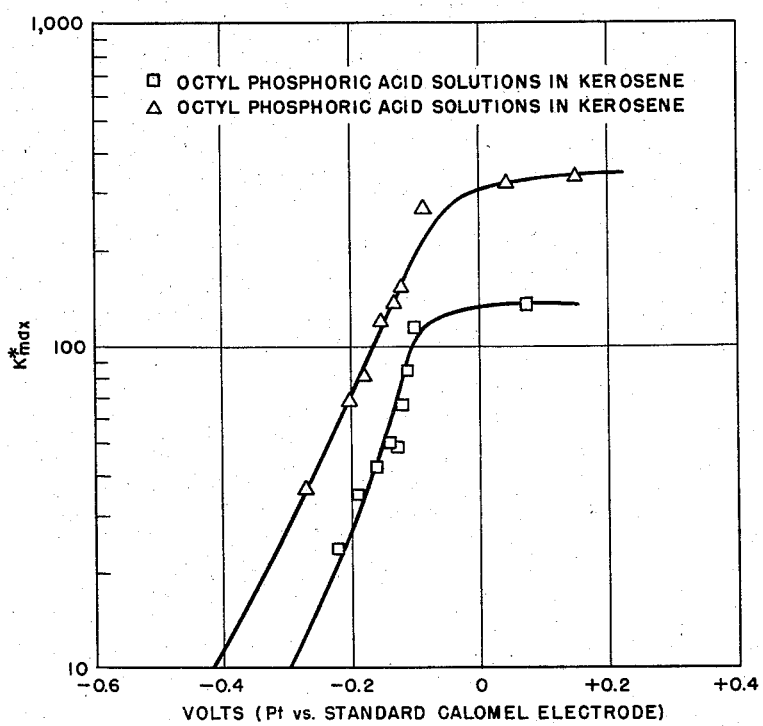
Figure 3 is a graphical illustration of the relation between oxidation state of the acid and the extractability of the uranium.

With reference to Fig. 3, the curve drawn through the experimental points plotted as squares illustrates the beneficial effect of reducing the acid whereby the uranium is converted from the uranyl, $UO_2^{++}$, state into the more positively ionized, tetravalent, $U^{+4}$, state. Such curve is a plot of log 10 of $K^*$ vs. E. M. F. (Pt vs. S. C. E.) calculated from isotherms obtained with various concentrations of octyl phosphoric acid in kerosene. As may be seen therefrom, reduction of the acid solution to a positive value of E. M. F. increases the distribution coefficient, $K^*$, by a factor of over ten times. Accordingly, it is apparent that much less extractant is required for equivalent recovery when the uranium is in the tetra-positive state.

It will be noted that the solution described above contains substantial amounts of fluoride. Such fluoride, particularly if present as fluoride ion, $F^-$, markedly reduces the extractability of uranium from the solution. Siliceous materials added to the solution eliminate the effect as indicated by the curve drawn through the experimental points plotted as triangles, of Fig. 3, comparable with the first curve, obtained with untreated acid. Such siliceous material should be supplied in amounts sufficient to complex all of the fluoride present. Silicofluoride present in the solution has little effect upon extractability. Storage in glass vessels, contact with glass wool or finely divided siliceous material such as diatomaceous earth and addition of soluble siliceous materials are all effective in eliminating the deleterious effect of the fluoride.

The organic solvent phase of preference for conducting an extraction in accordance with the present invention comprises certain alkyl O-phosphoric acids, alkyl phosphonic acids and alkyl phosphitic acids in admixture with a diluent solvent. Equivalently, as is common in the art, such acids may also be referred to as esters or as alkyl phosphates, alkyl phosphonates or alkyl phosphites. Butyl, amyl, hexyl, heptyl, octyl nonyl and decyl alkyl derivatives of either O-phosphoric or O-phosphorous acids ($H_3PO_4$ or $H_3PO_3$) are preferred for the purpose. A wide range of concentrations of the extractant, extending from the undiluted material to solutions of only a few percent thereof, may be employed under appropriate conditions.

Certain general and specific properties are important considerations in choosing the extractant. The extractant must have only a limited solubility in the acidic phosphatic solution and the extracted metal derivative, i. e., the metal derivative formed between the extractant and the metal ion which is being extracted, must be soluble in the selected organic phase. In general, the mono- and di- alkyl derivatives have higher extraction coefficients, and mixtures thereof may have optimum extraction properties. These mono- and di-alkyl derivatives are the preferred materials mentioned above. As may be noted, such derivatives possess at least one ionizable hydrogen. As an example of the aforesaid higher extraction coefficient it was found that commercial mixtures of the mono- and di-butyl O-phosphates, i. e., the acidic derivatives, had a uranium extraction coefficient of the order of tenfold larger than that of the neutral derivative, tributyl phosphate, under comparable conditions. For example, octyl phosphoric acid mixtures wherein there is a mole ratio of about 2 di- to 1 mono-alkyl substituents were found, under certain conditions, to yield the highest extraction coefficients.

Comparison between certain commercial n-butyl, n-amyl and n-octyl phosphoric acids indicates that the n-amyl derivative is somewhat more effective judged on a basis of the amount of uranium extracted relative to weight of extractant. Studies of the effect of chain branching of the substituent alkyl groups indicate that the secondary and iso-derivatives, i. e., those in which the chain branch is closer to the phosphate atom, are somewhat superior to the normal alkyl derivatives. Solubility losses decrease with increase in chain length; of these cases, moreover, the solubility loss may be made less by using greater proportions of diluent. Generally speaking the extractant compound or mixtures thereof in which there is the greatest number of —OH and =O groups will be the better extractant. On the basis of availability and lower extractant losses the extractants having heavier substituent chain groups are preferred with octyl phosphoric acid being the extractant of choice.

While the amount of metal extracted is directly dependent on the concentration of the extractant in the organic phase and theoretically, therefore, pure extractant phase would appear to yield highest recoveries, in practice it has been found desirable and even necessary to employ an appropriate diluent in the extractant phase. Prime requirements for the diluent are low viscosity, low solubility and low emulsification in the acidic aqueous phase and high solubility of the extractant and extracted metal value therein. Phase ratios of from about 1 to 10, organic to aqueous, have proven satisfactory in practice; however, other phase ratios may likewise be employed.

Many of the commercially available fluid petroleum products have been found suitable as diluents. Included in the group of suitable materials are various kerosenes, aromatic solvents, distillates, Stoddard solvents, petroleum ethers, aromatic oils (General Petroleum Aromatic Oils 1019 and 1409), diesel oils, and other solvents and petroleum products of similar viscosities, boiling points and compositions. Benzene, chlorobenzene, toluene, hexone, chlorinated hydrocarbons and medium boiling ethers are also suitable. In view of the diverse nature of the suitable solvents it will be apparent that materials other than those specified will also be suitable. In view of solubility requirements, the more aromatic and partially unsaturated solvents are generally employed with the lower alkyl phosphoric acids while less aromatic solvents may be employed with the higher alkyl phosphoric acids. With the lower alkyl derivatives of the phosphatic acids solubility in the aqueous phase increases and solubility in the organic phase decreases as compared with the higher molecular weight members of the group. Therefore, materials which are the better solvents are employed with the lower molecular weight phosphoric acids while less efficient solvents may be employed with the higher molecular weight materials.

In order to perform the actual extraction the organic phase comprising the alkyl phosphatic extractant and diluent is contacted with the acidic phosphatic solution prepared as described above, whereby the metal value is extracted therein. Metal values, which are soluble in the acidic phosphatic solution, are extracted therefrom with greatly increasing distribution coefficients as the degree of positive ionization of the ions is increased. Singly, positively ionized ions such as $Na^+$, $K^+$, etc., are not extracted to an appreciable extent. Doubly ionized ions including those of the second group of the Periodic System such as $Ca^{++}$, $Mg^{++}$, etc., as well as ions such as $Fe^{++}$, are extracted to only a limited degree; however, tripositively charged ions of elements of higher atomic weights such as $Fe^{+3}$, as well as those of the rare earths including cerium, are extracted with high efficiency. Tripositive ions of the lighter elements of group III of the periodic system, such as $Al^{+3}$, are extracted with considerably less efficiency than the heavier elements of the tripositive group. Tetrapositive metal ion values such as $Th^{+4}$ and $U^{+4}$, as well as other highly ionized ions of the lanthanide and actinide series of elements, are extracted with the highest distribution coefficients. Dipositive ions of the uranyl class, $UO_2^{++}$, exhibit a somewhat anomalous behavior in that substantial extraction, less, however, than with tetrapositive ions, is obtained. A similar behavior is to be expected with similar, -yl, ions of the other actinide elements, e. g., neptunyl, plutonyl, etc.

In view of the preferential extraction of various positively charged metal ionic values as indicated in the foregoing, it is apparent that the extraction step is highly preferential and may, therefore, be employed to effect a substantial purification of the more positively charged and consequently better extracted metal values. Moreover, in those cases in which the ions of an element may exist in two or more positively charged ionic states, control of the degree of positive charge will determine the extractability. Therefore, an element may be made to remain in the acid solution by appropriate treatment while another element is preferentially extracted. Oxidation and reduction as well as other appropriate treatment may be employed for this purpose. Iron is an example of such an element since iron in the dipositive ionic state extracts poorly while tripositive iron extracts quite well. In the presence of uranium in the acidic solution reduction of the solution as described above simultaneously lessens the extractability of the iron and greatly enhances the extractability of the uranium, yielding uranium products less contaminated with iron.

An analysis of a typical extract of a crude phosphoric acid solution, similar to that described above, employing a 10% solution of octyl phosphoric acid in kerosene, is as follows:

|  |  | Unreduced Acid | Reduced Acid |
|---|---|---|---|
| $U_3O_8$ | mg./l. | 300 | 800 |
| Fe | g./l. | 1.0 | 0.145 |
| Al | g./l. | 0.03 | 0.04 |
| Ca | g./l. | 0.03 | 0.00 |

Following the completion of the extraction step the uranium or other metal is recovered from the extract. Illustratively, several alternative methods may be employed to recover the uranium as follows: It will be apparent to one skilled in the art that certain of these methods are applicable to the other extracted metals.

Method A
PRECIPITATION WITH HF

The uranium can be recovered from the extract in a simple and economical fashion by contacting the extract with aqueous HF solutions, whereby the uranium precipitates as a fluoridic material. In order to avoid emulsification difficulties which are often encountered with dilute HF solutions and deteriorative effects caused by the use of anhydrous HF, an aqueous solution of about 30 to 60% HF by weight is preferably employed. The precipitation is nearly quantitative when an amount of HF of about at least equal weight to the uranium is employed for recovering the uranium from a 10% octyl phosphoric acid in kerosene solution. Filtration and drying of the precipitate yields a cake analyzing uranium equivalent to about 50% of $U_3O_8$.

The amount of HF required is dramatically reduced and the efficiency of the precipitation is improved if concentrated phosphoric acid is added to the aqueous HF precipitant. $H_3PO_4$ of about 60% concentration in a maximum amount of about 10% of the extract volume is combined with the HF precipitant and the mixture employed as in the case of the aqueous HF solution. In this case the precipitate product will comprise uranous phosphate material. The beneficial effect of adding the concentrated $H_3PO_4$ appears quite specific since numerous other tested materials fail to yield a similar result.

Method B
RE-EXTRACTION WITH CONCENTRATED PHOSPHORIC ACID

It has been found that the distribution coefficient of uranium between phosphoric acid solutions and the alkyl phosphoric acid extractant solution diminishes as the phosphate concentration is increased. This distribution coefficient, $K_D$, has a value of about unity for 68% phosphoric acid solution and 10% octyl phosphoric acid extractant solution in kerosene and a value of about 1/7 with 85% phosphoric acid. Oxidation of the uranium with a little $H_2O_2$ lowers this value still further by a factor of about ½. Permanganate and chlorite may likewise be employed for oxidizing the acid.

Accordingly, concentrated $H_3PO_4$ can be employed to extract the uranium therein and the uranium recovered therefrom by one of the following methods:

(1) In the first method, the acid extract is diluted to about 20% $H_3PO_4$ concentration and HF added to yield a fluoridic precipitate containing the uranium.

(2) In the second method, the acid extract is diluted to about 20–30% $H_3PO_4$ concentration and the uranium is extracted with an alkyl phosphoric acid extractant and a purified precipitate is obtained by treating with aqueous HF solution as described under Method A.

Method C
RE-EXTRACTION WITH CONCENTRATED HYDROCHLORIC ACID

The uranium may be extracted from the extractant phase by contact with concentrated HCl solution. The distribution coefficient, $K_D$, for uranium between 20% octyl phosphoric acid in kerosene and 11.7 M HCl has a value of about 1.7 favoring the aqueous phase. However, lowering the HCl concentration by a small amount seriously reduces the distribution coefficient. Oxidation with $H_2O_2$, $KMnO_4$ or $NaClO_2$ is found to increase the value to about 2.2 whereupon, the extraction, performed in a Scheibel column yields a hydrochloric acid solution containing uranium to the extent of several grams per liter. Either of the two following methods may be employed to recover the uranium from the hydrochloric acid solution:

(1) In accordance with the first method the hydrochloric acid is distilled leaving the uranium in a solid residue which is suitable for further processing.

(2) In accordance with the second method the uranium is adsorbed and then eluted from an anionic exchange column. More specifically, the hydrochloric acid solution is treated with an oxidizing agent such as $MnO_2$, if such oxidation has not been previously accomplished, to form anionic chloride complexes in the solution.

Such oxidized solution is then passed through a highly basic anionic exchange resin such as Dowex 1. From relatively concentrated HCl solution, i. e., above about 5 N HCl, the anionic uranium complex is adsorbed while a majority of impurities, being in the cationic form, pass through the column. Elution is performed by passing water through the column with the uranium appearing in the elutriant when about one column volume of the water elutriant has passed through. Finally the uranium is precipitated from the elutriant by adding ammonia thereto and the precipitate is separated from the solution and calcined to yield a fairly pure uranium oxide product.

Method D
DIRECT PRECIPITATION WITH AMMONIA

The uranium may also be recovered in by a mass precipitation by contacting the extractant phase with sufficient ammonia to neutralize the first hydrogen of the alkyl phosphoric acid. Calcination of the precipitate, filtered from the solution and calcined, yields a uranium material containing considerable phosphate.

Following removal of the uranium or other metal value from the extractant phase, such extractant may be replenished with makeup alkyl phosphoric acid and recycled for use as with the original material. When concentrated HCl is employed as in Method C, above, to remove the uranium from the extractant phase, such phase should be washed with water to remove the HCl extracted therein.

While the foregoing methods for recovering the metals from the extractant have been described with particular reference to uranium, certain are considered applicable to the other metals extracted therein. Generally speaking, the alkaline and fluoridic precipitations as well as the reextractions are also applicable to the lanthanide and actinide elements. Oxidation is omitted in those cases where only the extractable ionic state exists for a particular element.

While there has been described, in the foregoing, what may be considered to be preferred embodiments of the invention, it will be understood that many modifications therein will be apparent to one skilled in the art, and it is therefore intended to cover all such as fall within the scope of the appended claims.

What is claimed is:

1. In a process for recovering a metal value selected from the group consisting of uranium and thorium, from a solid material, the steps comprising producing an acidic phosphatic solution of said metal value containing said metal value in at least a trivalent and dipositively charged ionic state, contacting said solution with a solvent extractant phase containing a diluent and a material selected from the group consisting of mono and di alkyl phosphates, alkyl phosphonates and alkyl phosphites, whereby said metal forms a derivative compound with said material and thereby said metal value enters said extractant phase, and recovering the metal value from said extractant.

2. In a process for purifying and recovering a metal value selected from the group consisting of uranium and thorium from a material containing fluoridic impurities, the steps comprising producing an acidic phosphatic solution containing said metal value in at least a trivalent and dipositively charged ionic state and which solution is contaminated with fluoride ion, treating said solution with a siliceous material to convert the fluoride ion into silicofluoride, contacting the solution with a solvent phase comprising a diluent and an extractant selected from the group consisting of mono and di alkyl phosphates, alkyl phosphonates and alkyl phosphites, whereby said metal forms a derivative compound with said material and is thereby extracted into the solvent phase, and recovering the metal value from the extract.

3. In a process for the purifying and recovering a metal value selected from the group consisting of uranium and thorium from an acidic phosphatic solution wherein it may exist in two or more positively charged ionic states with an impurity of similar ionic characteristics, the steps comprising selectively converting the metal value to the most highly charged ionic state and the impurity to a less positively charged ionic state in the solution, contacting the solution with an extractant phase comprising a diluent and a material selected from the group consisting of mono and di alkyl phosphates, alkyl phosphonates and alkyl phosphites, whereby the more positively charged metal value is selectively extracted therein, and recovering the metal value from the extract.

4. In a process for purifying and recovering metal values selected from the group consisting of uranium and thorium from an acidic phosphatic solution containing impurities, the steps comprising treating said solution to convert said metal values to at least a tripositively charged ionic state and impurities to less positively charged ionic states, contacting said solution with an extractant phase comprising a diluent and a material selected from the group consisting of mono and di alkyl phosphates, alkyl phosphonates and alkyl phosphites, whereby the more positively charged metal value forms a derivative compound with said material and is selectively extracted and the impurities remain in the solution, and recovering the metal value from the extract.

5. In a process for purifying and recovering hexavalent uranium values from an acidic phosphatic solution containing impurities including ferric iron, the steps comprising reducing the solution to convert the uranium into the tetravalent ionic state and the iron to the ferrous state, contacting the solution with an extractant phase comprising a diluent and an extractant material selected from the group consisting of mono and di alkyl phosphates, alkyl phosphonates and alkyl phosphites, whereby the uranium is selectively extracted away from the iron in the solution, separating the extract phase from the solution and recovering the uranium from the extract.

6. In a process for purifying and recovering hexavalent uranium values from an acidic phosphatic solution containing impurities including ferric iron, the steps comprising reducing the solution to convert the uranium into the tetravalent ionic state and the iron to the ferrous state, contacting the solution with an extractant phase comprising a diluent and an extractant material selected from the group consisting of mono and di alkyl phosphates, alkyl phosphonates and alkyl phosphites, whereby the uranium is selectively extracted away from the iron in the solution, separating the extract phase from the solution, contacting the extract with an HF solution of about 30 to 60% concentration to precipitate the uranium from the extract, and separating the precipitate from the solutions.

7. In a process for purifying and recovering hexavalent uranium values from an acidic phosphatic solution containing impurities including ferric iron, the steps comprising reducing the solution to convert the uranium into the tetravalent ionic state and the iron to the ferrous state, contacting tthe solution with an extractant phase comprising a diluent and an extractant material selected from the group consisting of mono and di alkyl phosphates, alkyl phosphonates and alkyl phosphites, whereby the uranium is selectively extracted away from the iron in the solution, separating the extract phase from the solution, contacting the extract with an HF solution of about 30–60% concentration and with the addition of about 10% of the extract volume of 60% $H_3PO_4$ to precipitate the uranium from the extract, and separating the precipitate from the solutions.

8. In a process for purifying and recovering hexavalent uranium values from an acidic phosphatic solution containing impurities including ferric iron, the steps comprising reducing the solution to convert the uranium into the tetravalent ionic state and the iron to the ferrous state, contacting the solution with an extractant phase comprising a diluent and an extractant material selected from the group consisting of mono and di alkyl phosphates, alkyl phosphonates and alkyl phosphites, whereby the uranium is selectively extracted away from the iron in the solution, separating the extract phase from the solution, oxidizing the uranium in the extract to the hexavalent state, contacting the oxidized extract with concentrated $H_3PO_4$ to reextract the uranium therein, diluting the phosphoric acid extract to the range of about 20 to 30% of $H_3PO_4$, adding an HF solution of about 30 to 60% concentration to the phosphoric acid extract to precipitate the uranium, and separating the uranium precipitate from the solution.

9. In a process for purifying and recovering hexavalent uranium values from an acidic phosphatic solution containing impurities including ferric iron, the steps comprising reducing the solution to convert the uranium into the tetravalent ionic state and the iron to the ferrous state, contacting the solution with an extractant phase comprising a diluent and an extractant material selected from the group consisting of mono and di alkyl phosphates, alkyl phosphonates and alkyl phosphites, whereby the uranium is selectively extracted away from the iron in the solution, separating the extract phase from the solution, extracting the uranium from the diluted phosphoric acid solution with a fresh quantity of said extractant phase, contacting the extract with an HF solution of about 30 to 60% concentration to precipitate the uranium from the extract, and separating the precipitate from the solutions.

10. The process as defined in claim 9 wherein said extractant material is an alkyl phosphate wherein the chain length of the alkyl substituent is from 4 to 10 carbon atoms.

11. In a process for purifying and recovering hexavalent uranium values from an acidic phosphatic solution containing impurities including ferric iron, the steps comprising reducing the solution to convert the uranium into the tetravalent ionic state and the iron to the ferrous state, contacting the solution with an extractant phase comprising a diluent and an extractant material selected from the group consisting of mono and di alkyl phosphates, alkyl phosphonates and alkyl phosphites, whereby the uranium is selectively extracted away from the iron in the solution, separating the extract phase from the solution, oxidizing the uranium in the solvent extract phase to the hexavalent state, contacting the extract with a concentrated HCl aqueous phase to extract the hexavalent uranium therein, separating the phases, and distilling HCl from the aqueous phase to recover the uranium as a solid residue.

12. In a process for purifying and recovering hexavalent uranium values from an acidic phosphatic solution containing impurities including ferric iron, the steps comprising reducing the solution to convert the uranium into the tetravalent ionic state and the iron to the ferrous state, contacting the solution with an extractant phase comprising a diluent and an extractant material selected from the group consisting of mono and di alkyl phosphates, alkyl phosphonates and alkyl phosphites, whereby the uranium is selectively extracted away from the iron in the solution, separating the extract phase from the solution, oxidizing the uranium in the solvent extract phase to the hexavalent state, contacting the extract with a concentrated HCl aqueous phase to extract the hexavalent uranium therein, separating the phases, distilling HCl from the aqueous phase to recover the uranium as a solid residue, washing the solvent phase with water, and recycling the solvent phase to again extract uranium.

13. The process as otherwise defined in claim 11 wherein said extractant comprises an alkyl phosphoric acid wherein the chain length of the alkyl substituent is from 4 to 10 carbon atoms.

14. In a process for purifying and recovering hexavalent uranium values from an acidic phosphatic solution containing impurities including ferric iron, the steps comprising reducing the solution to convert the uranium into the tetravalent ionic state and the iron to the ferrous state, contacting the solution with an extractant phase comprising a diluent and an extractant material selected from the group consisting of mono and di alkyl phosphates, alkyl phosphonates and alkyl phosphites, whereby the uranium is selectively extracted away from the iron in the solution, separating the extract phase from the solution, oxidizing the uranium in the solvent extract phase to the hexavalent state, contacting the extract with a concentrated HCl aqueous phase to extract the hexavalent uranium therein, separating the phases, contacting the HCl aqueous phase with an anion exchange resin to adsorb the uranium as anionic chloride complexes thereon, eluting the uranium from the resin with water, precipitating the uranium from the eluate with ammonia, and calcining the precipitate to yield uranium oxide.

15. In a process for purifying and recovering hexavalent uranium values from an acidic phosphatic solution containing impurities including ferric iron, the steps comprising reducing the solution to convert the uranium into the tetravalent ionic state and the iron to the ferrous state, contacting the solution with an extractant phase comprising a diluent and an extractant material selected from the group consisting of mono and di alkyl phosphates, alkyl phosphonates and alkyl phosphites, whereby the uranium is selectively extracted away from the iron in the solution, separating the extract phase from the solution, treating the extract with aqueous ammonia to precipitate the uranium therefrom, and calcining the precipitate the yield a uranium oxide-phosphate residue.

16. In a method for purifying and recovering a metal value selected from the group consisting of lanthanides and actinides, the steps comprising producing an aqueous acidic phosphatic solution of such metal value in at least a tripositively charged ionic state, extracting said metal value therefrom with a solvent phase comprising a diluent and an extractant selected from the group consisting of mono and di alkyl phosphates, alkyl phosphonates and alkyl phosphites, contacting the solvent extract phase with a 30 to 60% aqueous HF solution to precipitate the metal value therefrom, and separating the precipitate from the solutions.

17. In a method for purifying and recovering a metal value selected from the group consisting of lanthanides and actinides, the steps comprising producing an aqueous acidic phosphatic solution of such metal value in at least a tripositively charged ionic state, extracting said metal value therefrom with a solvent phase comprising a diluent and an extractant selected from the group consisting of mono and di alkyl phosphates, alkyl phosphonates and alkyl phosphites, oxidizing the metal value in the extract to the hexavalent state, contacting the oxidized extract with concentrated $H_3PO_4$ to reextract the metal value therein, diluting the phosphoric acid extract to the range of about 20 to 30% of $H_3PO_4$, adding an HF solution to about 30 to 60% concentration to the phosphoric acid extract to precipitate the metal value, and separating the metal value precipitate from the solution.

18. In a method for purifying and recovering a metal value selected from the group consisting of lanthanides and actinides, the steps comprising producing an aqueous acidic phosphatic solution of such metal value in at least a tripositively charged ionic state, extracting said metal value therefrom with a solvent phase comprising a diluent and an extractant selected from the group consisting of mono and di alkyl phosphates, alkyl phosphonates and alkyl phosphites, oxidizing the metal value in the extract to the hexavalent state, contacting the oxidized extract with concentrated $H_3PO_4$ to reextract the metal value therein, diluting the phosphoric acid extract to the range of about 20 to 30% of $H_3PO_4$, extracting the metal value from the diluted phosphoric acid solution with a fresh quantity of said extractant phase, contacting the extract with an HF solution of about 30 to 60% concentration to precipitate the metal value from the extract, and separating the precipitate from the solutions.

19. In a method for purifying and recovering a metal value selected from the group consisting of lanthanides and actinides, the steps comprising producing an aqueous acidic phosphatic solution of such metal value in at least a tripositively charged ionic state, extracting said metal value therefrom with a solvent phase comprising a diluent and an extractant selected from the group consisting of mono and di alkyl phosphates, alkyl phosphonates and alkyl phosphites, treating the solvent extract with aqueous ammonia to precipitate the metal value therefrom, and calcining the precipitate.

20. In a method for purifying and recovering a metal value selected from the group consisting of lanthanides and actinides, the steps comprising producing an aqueous acidic phosphatic solution of such metal value in at least a tripositively charged ionic state, extracting said metal value therefrom with a solvent phase comprising a diluent and an extractant selected from the group consisting of mono and dialkyl phosphates, alkyl phosphonates and alkyl phosphites, treating the solvent extract with oxidation-reduction agents to convert said metal value to a less positively charged ionic state, contacting the extract with a concentrated $H_3PO_4$ solution to extract the metal value therein, diluting the $H_3PO_4$ extract to about 20 to 30% concentration, treating the diluted solution with aqueous HF to precipitate the metal value therefrom, and separating the precipitate from the solutions.

21. In a method for purifying and recovering a metal value selected from the group consisting of lanthanides and actinides, the steps comprising producing an aqueous acidic phosphatic solution of such metal value in at least a tripositively charged ionic state, extracting said metal value therefrom with a solvent phase comprising a diluent and an extractant selected from the group consisting of mono and dialkyl phosphates, alkyl phosphonates and alkyl phosphites, treating the solvent extract by oxidation-reduction agents to convert said metal value to a less positively charged ionic state, contacting the extract with a concentrated $H_3PO_4$ solution to extract the metal value therein, diluting the $H_3PO_4$ extract to about 20 to 30% concentration, contacting the diluted $H_3PO_4$ extract with a fresh portion of said solvent phase, treating the said solvent extract with aqueous HF of about 30 to 60% concentration to precipitate the metal value therefrom, and separating the precipitate from the solutions.

22. In a process for purifying and recovering uranium values from an acidic phosphatic solution, the steps comprising contacting the solution with an extractant phase comprising a diluent and a material selected from the group consisting of mono and dialkyl phosphates, alkyl phosphonates and alkyl phosphites, whereby the uranium values form derivative compounds with said material and thereby are extracted therein, and recovering the uranium values from the extract.

23. In a process for purifying and recovering hexavalent uranium values from an acidic phosphatic solution, the steps comprising reducing the solution to convert the uranium into the tetravalent ionic state therein, then contacting the solution with an extractant phase comprising a diluent and a mono and di substituted alkyl O-phosphoric acid wherein the alkyl radicals have 4 to 10 carbon atoms in the chain, whereby the uranium forms a derivative of said acid and is extracted into said phase, and recovering the uranium from the extract.

24. In a process for purifying and recovering uranium values wherein there is produced an acidic phosphatic solution of said values in the tetravalent state, the step comprising contacting said solution with an extractant phase comprising a diluent and a material selected from the group consisting of mono and di alkyl phosphates, alkyl phosphonates and alkyl phosphites, whereby the uranium forms a derivative compound with said material and is extracted therein.

25. The process as defined in claim 24 wherein said extractant material comprises an alkyl O-phosphoric acid wherein the alkyl radicals have from 4 to 10 carbon atoms.

26. In a process for recovering the hexavalent uranium values from an acidic phosphatic solution, the steps comprising treating said solution with a reducing agent to place the uranium in a tetravalent ionic state, then contacting the solution with an extractant phase comprising a diluent and a material selected from the group consisting of mono and dialkyl phosphates, alkyl phosphonates and alkyl phosphites, whereby the uranium forms a derivative compound with said material and is extracted therein, and recovering the uranium from the extract.

27. The process as defined in claim 26 wherein said extractant material comprises an alkyl O-phosphoric acid wherein the alkyl radicals have from 4 to 10 carbon atoms.

References Cited in the file of this patent

Warf: U. S. Atomic Energy Commission Declassified Document No. 2524, declassified March 11, 1949, 10 pages.

Ellis: DOW–81, July 14, 1952, pages 11–71.